United States Patent
McSherry

[11] Patent Number: 5,833,415
[45] Date of Patent: Nov. 10, 1998

[54] ANCHOR INSERT IMPROVEMENT

[75] Inventor: Thomas W. McSherry, Temple, Pa.

[73] Assignee: Titan Technology, Inc., Temple, Pa.

[21] Appl. No.: 556,984

[22] PCT Filed: Nov. 16, 1993

[86] PCT No.: PCT/US95/15465

§ 371 Date: Nov. 15, 1995

§ 102(e) Date: Nov. 15, 1995

[87] PCT Pub. No.: WO96/16293

PCT Pub. Date: May 30, 1996

Related U.S. Application Data

[63] Continuation-in-part of Ser. No. 344,823, Nov. 23, 1994, abandoned, which is a continuation-in-part of Ser. No. 234,482, Apr. 28, 1994, Pat. No. 5,536,121, which is a continuation-in-part of Ser. No. 153,374, Nov. 16, 1993, Pat. No. 5,529,449, which is a continuation-in-part of Ser. No. 965,735, Oct. 23, 1992, Pat. No. 5,308,203, which is a continuation-in-part of Ser. No. 949,425, Sep. 22, 1992, abandoned.

[51] Int. Cl.[6] .................................................... F16B 13/04
[52] U.S. Cl. .............................. 411/31; 411/387; 411/395
[58] Field of Search ................................ 411/31, 387, 29, 411/30, 178, 386, 399, 395, 424

[56] References Cited

U.S. PATENT DOCUMENTS

| 126,366 | 4/1872 | Wills ........................................ 411/387 |
|---|---|---|
| 4,601,625 | 7/1986 | Ernst et al. ............................... 411/387 |
| 5,098,435 | 3/1992 | Stednitz et al. ...................... 411/387 X |
| 5,160,225 | 11/1992 | Chern ......................................... 411/30 |
| 5,190,425 | 3/1993 | Wieder et al. ........................... 411/387 |
| 5,403,137 | 4/1995 | Grun et al. ............................... 411/387 |

*Primary Examiner*—Rodney M. Lindsey
*Attorney, Agent, or Firm*—Nolte, Nolte & Hunter P.C.

[57] ABSTRACT

A self-centering wall anchor 10, 100 having an outwardly threaded hollow cylindrical body 101, 111 with a flanged proximal end and a cutting distal end. The hollow cylindrical body diminishes in diameter toward the distal cutting end 20, 110 in the form of a pointed dome with a pointed centering tip 22, 103 at the center axis of the anchor. An inner bore 14, 105 extends continuously from its opening at the proximal end of the anchor along the center axis of the cylindrical body to the centering tip at the distal end where it is partially closed because of the disposition of the centering tip at the center axis. The distal end of the bore is in the form of a deep flute 21, 105a which communicates and is part of the inner bore and is defined at its outer edges by a leading cutting edge 23, 107 and a trailing edge 24, 108 of the single cutter, with the leading cutting edge extending from the pointed tip in a curved distention. In one instance, the outer thread extends to the centering tip and is interrupted in the area of the bore opening to assure optimum access to material cut from the wall as the anchor is rotated.

6 Claims, 4 Drawing Sheets

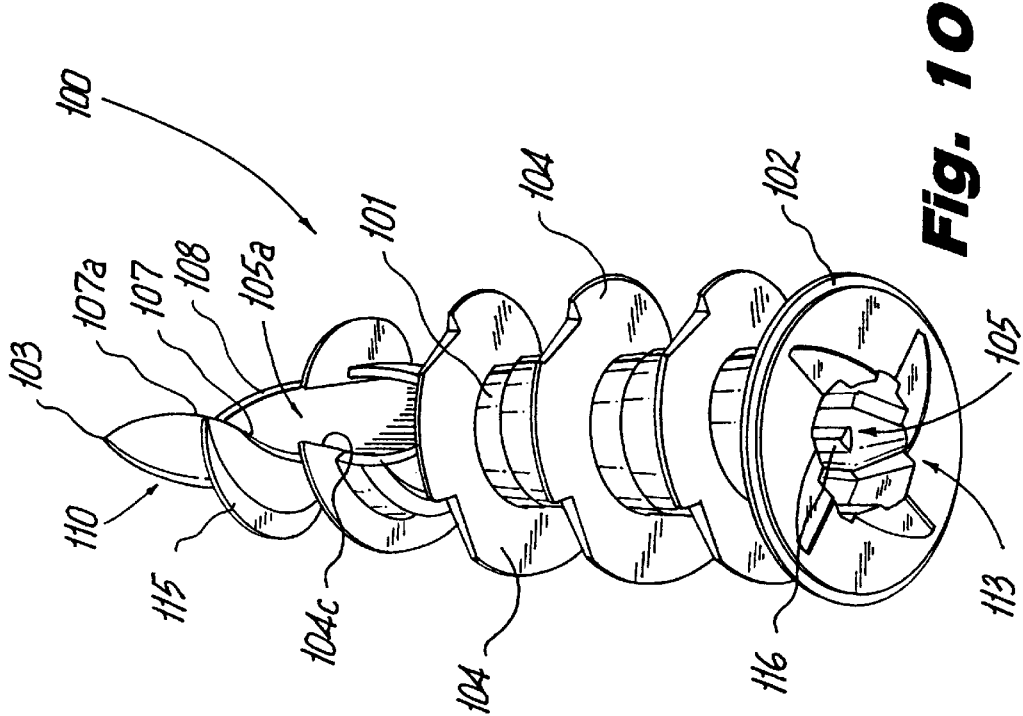
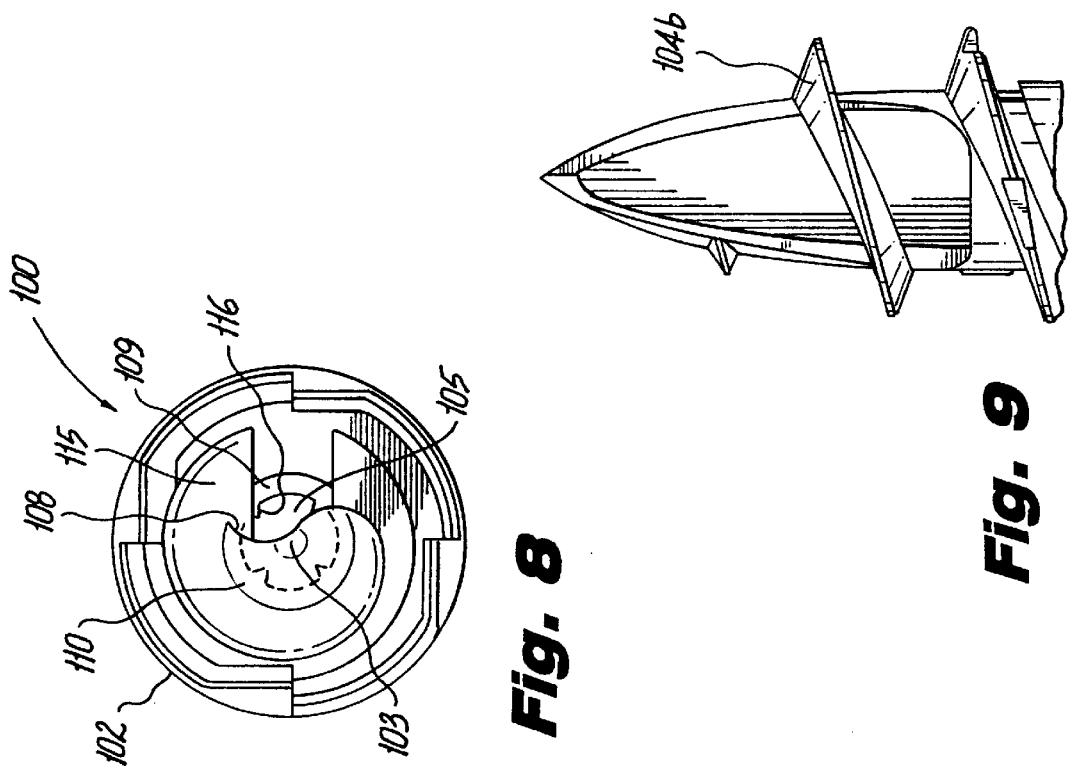

ANCHOR INSERT IMPROVEMENT

This application is a continuation-in-part of application Ser. No. 08/344,823, filed Nov. 23, 1994 now abandoned which is a continuation-in-part of application Ser. No. 08/234,482, filed Apr. 28, 1994 now U.S. Pat. No. 5,536,121 which is a continuation-in-part of application Ser. No. 08/153,374, filed Nov. 16, 1993, now U.S. Pat. No. 5,529,449 which is a continuation-in-part of application Ser. No. 08/965,735 filed Oct. 23, 1992, now U.S. Pat. No. 5,308,203 issued May 3, 1994 which was a continuation-in-part of application Ser. No. 07/949,425, filed Sep. 22, 1992, now abandoned.

BACKGROUND OF THE INVENTION

This invention relates to improvements in the wall anchor, disclosed in my prior application Ser. No. 08/344,823, fully incorporated herein by reference, for securing a support fastener and, particularly, to a cylindrical wall anchor with an outer thread for threading into wall material such as dry wall, sheet rock and wood comprising the surface material of a hollow wall or similar structure.

In U.S. Pat. No. 5,308,203 and in the aforementioned prior applications, the distal or cutting end of the anchor is constructed to provide a circular cut in the wall in advance of the outer threads as the distal end of the anchor is press-turned into the wall. The anchors disclosed in U.S. Pat. No. 5,308,203 have through bores extending from the flanged end of the anchor to the open cutting end where opposed saw teeth extend from the periphery. The open end provides access to the bore for wall material that is displaced by the sawing action of the teeth as the anchor is rotated and pressed into the wall. The threads which preferably extend and diminish in size from the flanged end to closely adjacent the teeth act to assist in drawing the anchor through the wall as do the threads of a screw when rotated into material.

In application Ser. No. 08/344,823, incorporated herein by reference, hollow cylindrical anchors are disclosed which provide centering points at their distal ends. In one instance, a flat arrow-shaped drill bit straddles the open distal end of the anchor. In another instance, a centering finger extends from the inner surface of the bore adjacent a single cutter which extends from the periphery of the open end. In yet another instance, the single cutter extending from the periphery of the anchor is formed as a cowl with the tip brought to the anchor's axis.

While these anchors with centering points work well to center the cutting end of the anchor and to leave an open area to receive the material dislodged from the wall by the cutter into the bore, it has been determined that a cutter fashioned after a drill bit of a fluted construction is a preferable centering device. The problem, however, which presents itself is if such a drill bit is incorporated in an anchor of this type, access to the bore for the dislodged material is lost, and a purely drilling operation would then push the drilled material axially to explode from the inner surface of the hollow wall or jamb the anchor in a solid wall.

The invention disclosed in application Ser. No. 08/344,823, incorporated herein by reference, provides an anchor with a hollow cylindrical body which diminishes in diameter toward the distal cutting end in the form of a pointed dome with a centering tip disposed at the center axis of the anchor. A single cutter with a centering tip, fluted along the side, much like a drill flute is formed at the dome-shaped distal end of the anchor. The cutter extends integrally from the outwardly threaded, hollow, cylindrical proximal end of the anchor with its tip at the axis of the anchor and its flute extending inwardly and proximally from the tip to communicate with, as an extension of, the bore of the proximal end. The flute, which now provides access to the bore of the anchor for the material being dislodged from the wall, is defined at its outer lateral edges by the leading and trailing edges of the cutter. Because of the direction of the edges of the flute, the leading edge is a sawing and cutting edge rather than a drilling edge. To this end, the leading edge extends radially and proximally from the tip in a plane in common with the axis of the anchor and at its forward or distal end is distended along a part of its length extending from the centering point in a curved path first outwardly then inwardly where it meets and forms part of the distal end of the bore at the entering end of the thread of the proximal end of the anchor. This inward curvature provides rearward axial cutting of wall material which has not been cut by the forward distal end of the leading edge because of the lesser diameter of the cutter forward of the distention. This configuration of the leading edge also tends to keep the anchor centered as it enters the wall.

In this construction, the axial length of the cutting end of the anchor need not be coextensive with the width of the wall in which it is inserted, because the outer thread of the anchor is designed to thread into the wall material as soon as the distal cutter is inserted in the wall so as to avoid drilling. The lead or axial thrust and rotation speed of the cutting end does not affect the lead of the outer threads of the anchor because the height of crest of the entering end of the thread is sufficiently low to enter the wall material without mutilating it. Preferably, the crest of the thread increases from the entry end to the flange of the anchor to provide a wedging action between the wall material and the root of the anchor threads.

Furthermore, it is recommended to use screws that are co-extensive with the threaded proximal end. Longer screws after threading through the splines on the inner surface of the bore of the anchor will dislocate or bend the cutting end as the tip of the screw hits the converging surface of the flute, particularly if the anchor is made of nylon or polypropylene or of other plastics or mixtures thereof. Consequently, the anchor could not be used in another installation, if desired.

It was found, however, that the distal end cutting tip, though operable, is weak to the extent that sometimes when cutting through wall material which was or had become more dense than usually encountered in most wall boards, the cutting end would twist and bend and some of the cut wall material would lodge between the outer surface of the cutting end and the wall material.

THE INVENTION

It is within the purview of the present invention to strengthen the cutting end of an anchor which has a flute extending from the center tip of the anchor proximally to form a part of and to communicate with the bore of the anchor.

To do this, I conceived to extend the thread on the outer surface of the proximal end to immediately adjacent the center tip so that the thread would surround the cutting end thereby strengthening it. Molding problems made doing so difficult (though not impossible) as the thread path would extend over the empty space formed by the flute. A more pressing problem resulted in that the thread partially closed the access opening, already partially closed because of the disposition of the centering tip at the anchor axis, thereby positioning the access opening along the side of the anchor.

The problems were overcome by interrupting the thread in the area of the flute passage. As it turned out, the edges of the interrupted thread at the leading; that is, cutting edge of the single cutter at the cutting end assist nicely in the simultaneous cutting and threading/tapping of the wall material while strengthening the cutting end against bending under the torque forces engendered by turning the anchor in the wall material.

DESCRIPTION OF THE DRAWINGS

FIG. 8 is a top plan view of the anchor of FIGS. 6–7 taken along the line 8—8 of FIG. 7;

FIG. 9 is a side plan view of, broken away, an anchor similar to the anchor of FIGS. 6–8, but showing the threading extending across the access area; and FIG. 10 is a is a perspective view of the anchor of FIGS. 6–8.

DETAILED DESCRIPTION OF THE ANCHORS OF THE DRAWINGS

Figure 1:
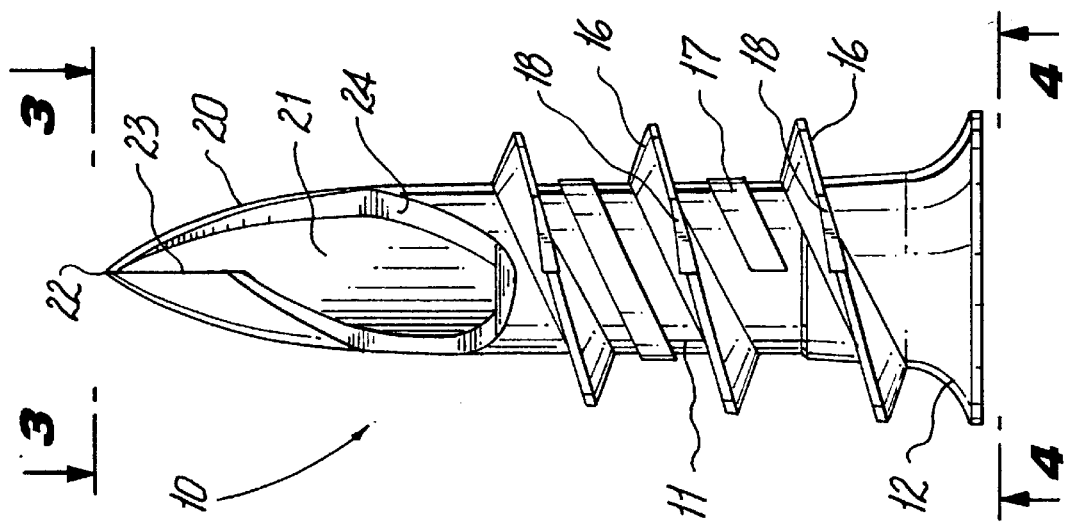
FIG. 1 is a side plan view of an anchor having a center point at the cutting end and outer threads extending from the proximal end to adjacent the cutting end.
Figure 2:
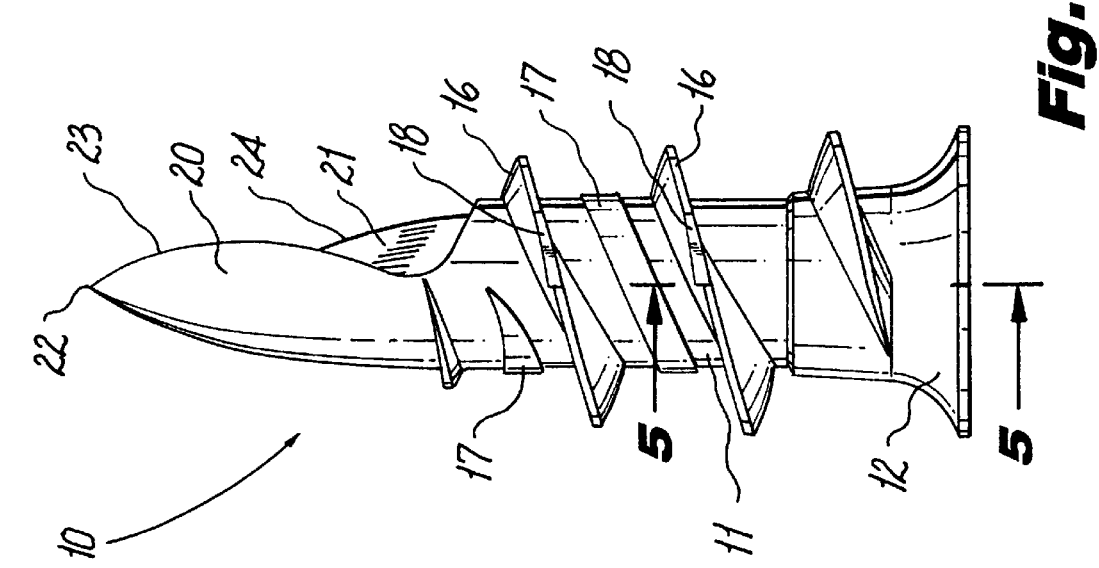
FIG. 2 is a front plan view of the anchor of FIG. 1 taken along the line 2—2 in FIG. 1.
Figure 5:
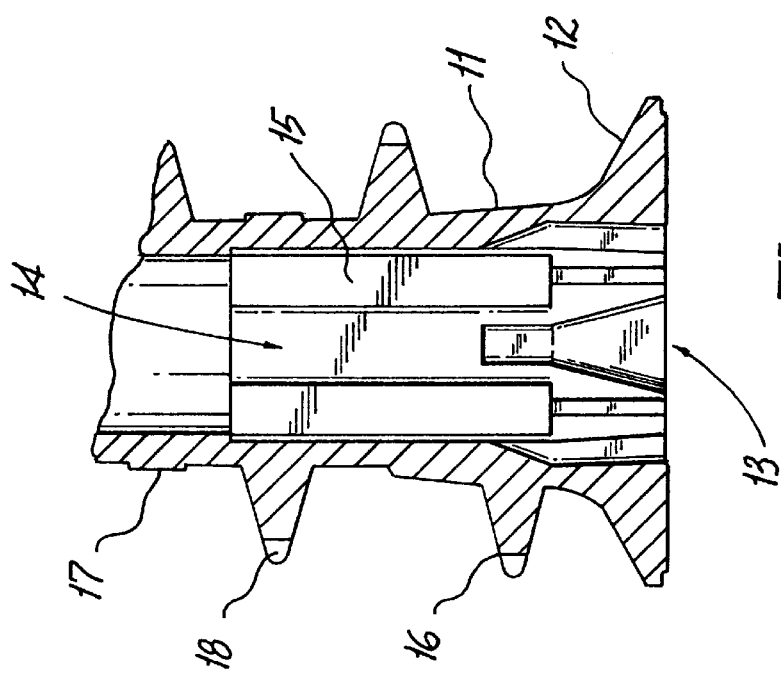
FIG. 5 is a broken away sectional view of the anchor of FIGS. 1–4 taken along the line 5—5 in FIG. 1.
Figure 3:
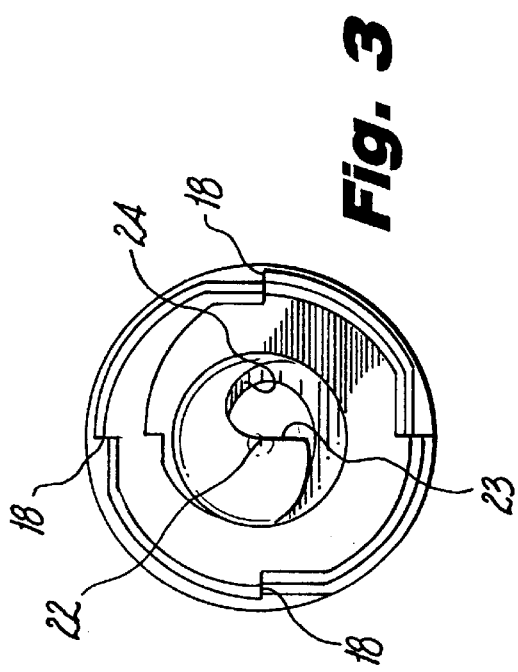
FIG. 3 is a top plan view of the anchor of FIGS. 1–2 taken along the line 3—3 of FIG. 2.
Figure 4:
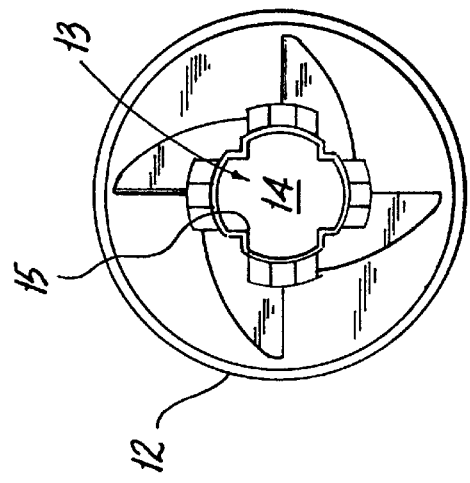
FIG. 4 is a bottom plan view of the anchor of FIGS. 1–3 taken along the line 4—4 in FIG. 2.

The anchor insert 10 of FIGS. 1–5 is disclosed in my prior application Ser. No. 08/344,823 and comprises a generally cylindrical proximal end 11 with an enlarged flanged end 12 providing a torque producing tool receptor opening 13 which communicates, along the axis of the anchor, with through bore 14. Bore 14 extends uninterruptedly along the axis of the anchor from the receptor opening to the flute 21 of cutter tip 20, with which the bore communicates.

Splines 15 extend axially along the inner surface of the bore for receiving the threading of a support screw, not shown. Threading 16 spirals around the outer surface of the anchor all along the proximal end of the anchor, diminishing in crest height from the flange 12 to the plane of joinder between the proximal end and the cutter. Flat band 17 spirals between the crests of the threading and acts to compact the wall material against itself when the anchor is threaded into the wall. The crests of the threading are formed with cutting indentations 18 to assist in the threading of the anchor into the wall. As the anchor is rotated, these indentations actually cut the path of the threading in the wall material.

Figure 7:
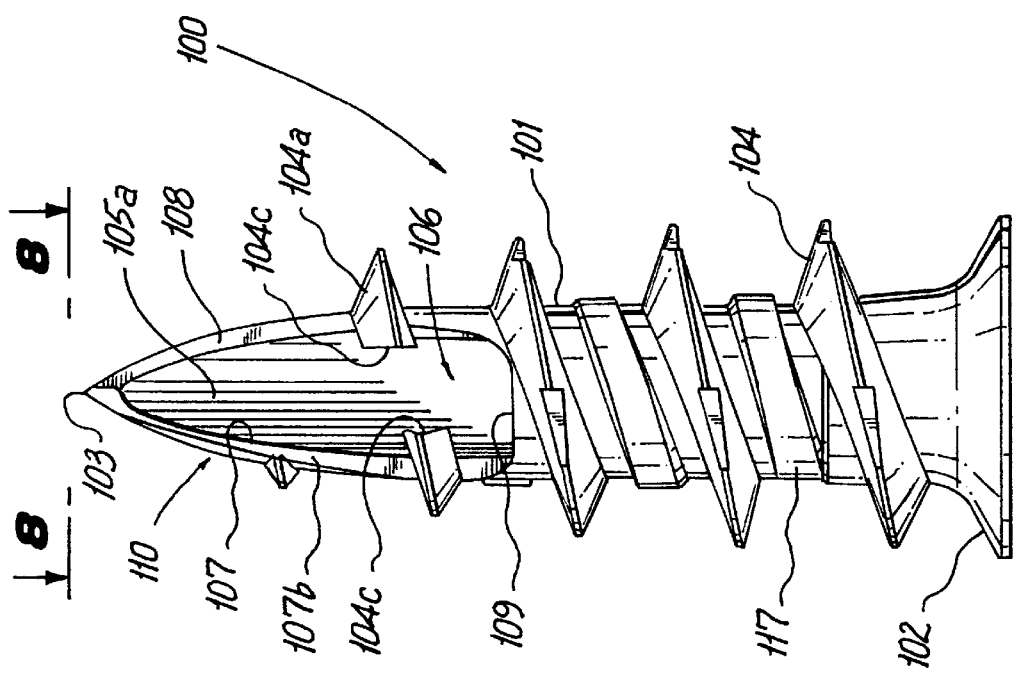
FIG. 7 is a front plan view of the anchor of FIG. 6 taken along the line 7—7 in FIG. 6.
Figure 6:
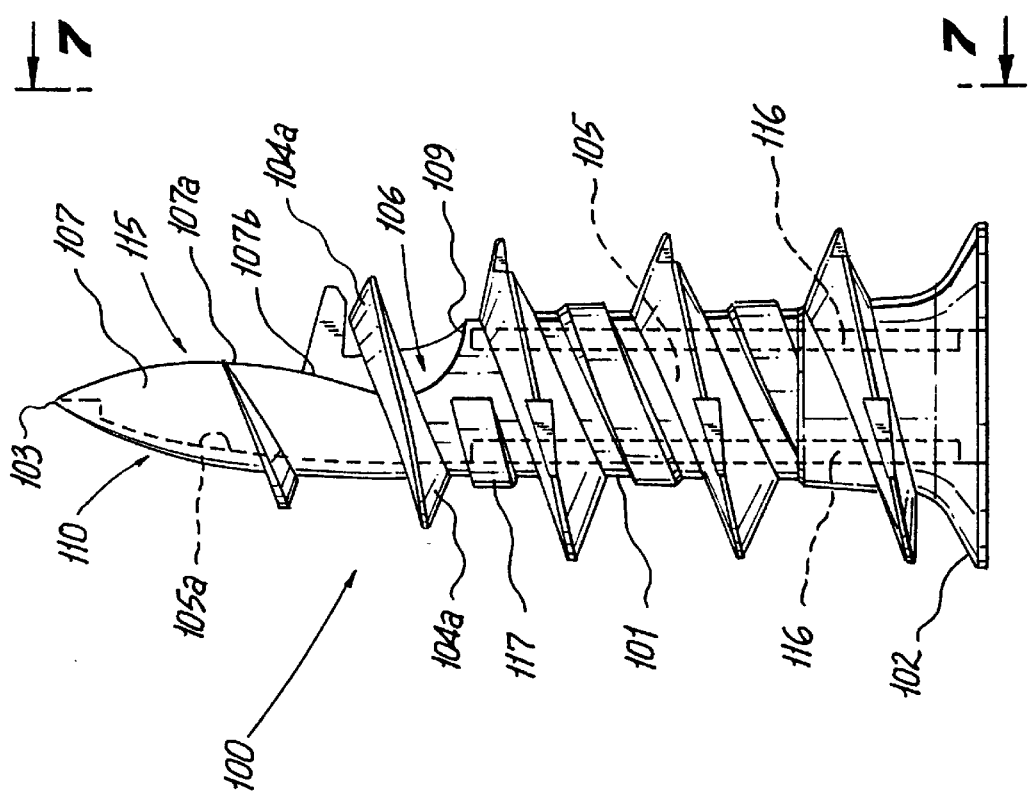
FIG. 6 is a side plan view of the improved anchor of the invention.

Referring to FIGS. 6–10, the anchor 100 comprises a hollow cylindrical body 101 with a proximal end having a flange 102. The cylindrical body diminishes in diameter from about the longitudinal center of the anchor (about 54% of the length of the anchor from the flanged end) to a distal cutting end in the form of a pointed dome with a centering tip 103 disposed at the center axis of the anchor.

High threading 104 extends along the outer surface of the cylindrical body from the flange to closely adjacent the centering tip. The threading in this instance decreases in height from about the longitudinal center of the body to the distal end of the threading near the centering tip.

Flat band 117 spirals between the crest turns of the threading and acts to compact the wall material against itself when the anchor is threaded into the wall.

An inner bore 105 extends continuously from its opening at the proximal end of the anchor along the center axis of the cylindrical body to the centering tip at the distal end where it is partially closed because of the diminishing diameter of the cylindrical body and the disposition of the centering tip at the center axis of the anchor. The distal end of the bore is open along the side of the single cutter 110 to provide access to wall material cut from the wall as the anchor is rotated.

Fastener receiving splines 116 extend axially along the inner surface of the bore 105 from the opening 113 at the proximal end to the single cutter 110 at the distal end.

As in the embodiment of FIGS. 1–5, the distal end of the bore 105a, because of the diminishing diameter of the distal end of the cylindrical body, is in the form of a deep flute. The opening of the distal end of the bore along the side of the single cutter, which provides access for material cut from the wall to the bore, is generally triangular in shape, the sides of which are formed by the leading and trailing edges 107, 108 of the single cutter 110, which extend from the apex at the centering tip in diverging spiral paths to a base at about the longitudinal center of the anchor (about 46% of the length of the anchor from the distal cutting end) formed by a circumferential segment 109 of the distal end of the cylindrical body.

The leading edge 107 extends along its spiral path, but is distended as at 107a along a part of its length extending from the centering point in an outwardly curved path while the trailing edge 108 extends along its spiral path without distention. The curvature of the distention returns inwardly as at 107b before edge 107 meets base segment 109 providing first, circular axial cutting of the material forward of the distention 107a and then circular axial cutting of the material rearward of the return 107b of the distention. The diameter of the anchor increases as the leading edge cuts in this manner while the opening of the distal end of the bore widens providing maximum access to the distal end of the bore for material cut from the wall.

As the anchor is rotated in the wall material, the distended edge acts to both cut the material and gather the cut material into the distal end of the opening of the bore rather than push the material circumferentially. The forward and rearward cutting action also tends to keep the anchor centered.

The opening 113 of the bore at the proximal end of the anchor is formed to receive a tool, such as a screw driver, to rotate the anchor after the centering tip and edges of the flute enter the wall material to approximately the distal end 115 of the thread.

It is important to note here that the thread turn 104a which extends along the outer surface of the single cutter 110 adds body and strength to the anchor at the distal cutting end to substantially avoid twisting of the anchor distal end as it is turned in the wall material.

While turn 104a might be extended in a complete spiral path as indicate at 104b in FIG. 9, because of operational effectiveness, it was determined to interrupt turn 104 in the area of the distal end of the bore, as at 104c, to provide better access for the cut wall material to the bore.

It was also found that the edge of the interrupted thread at the leading or cutting edge of the flute assisted in the cutting function of the cutter.

In operation, this embodiment of the invention provides for a centering tip which enters the wall material and is followed almost immediately by the distal end of the thread which, as the anchor is rotated, commences to cut into the wall to tap the wall material in the manner of a screw, without drilling a hole in advance of the tapping, and assists in pulling the anchor through the wall material until the anchor is embedded in the wall material with the flange and high threading, particularly of the proximal turn of the threading adjacent the flange, compacting the wall material around the cylindrical body and between the proximal turn of the thread and the flange to resist further turning of the anchor as the threads of a fastener cut into the fastener receiving elements in the bore.

The invention is to be limited only by the following claims.

I claim:

1. A wall anchor for insertion in wall board material, said wall anchor comprising a cylindrical body extending along a center axis and having a radially extending flange at a proximal end, said cylindrical body diminishing in diameter along a distal cutting end and forming a pointed dome with a centering tip disposed at the center axis of said anchor, an outer thread extending substantially along the length of said cylindrical body and an axial passage extending from an opening at said proximal end of said body to an opening at said distal cutting end of said body where said axial passage is partially closed because of the diminishing diameter of said cylindrical body and the disposition of said centering tip at the center axis of said anchor, means extending axially along said axial passage from said proximal end for receiving and for being tapped by the threads of a screw fastener, recess means at said proximal end for receiving a drive tool for rotating said anchor for cutting through the wall board with said distal cutting end, said opening of said axial passage at said distal cutting end of said anchor extending along only one side of said distal cutting end and comprising access means along said only one side of said distal cutting end communicating with said axial passage for passing material cut from the wall board into said axial passage, said opening of said axial passage at said distal end of said anchor being defined by a leading edge and a trailing edge of a single cutter, said edges extending from said centering tip in diverging spiral paths, said outer thread extending from said proximal end adjacent said flange to adjacent said single cutter and comprising means for tapping the wall board material and for pulling said anchor through the wall board material as said single cutter rotates without drilling a hole through the wall board in advance of said thread, said outer thread having a high turn adjacent said flanged proximal end, said high turn and said flanged end comprising means, when embedded in the wall material because of rotation of said anchor, for compressing wall material for resisting further distal movement of said anchor when a screw fastener is tapping said means for receiving and for being tapped by the threads of a screw fastener.

2. The anchor of claim 1 wherein said outer thread extends from said proximal end to adjacent said centering tip.

3. The anchor of claim 2 wherein said outer thread is interrupted at said opening of said bore at said distal cutting end of said body to provide uninterrupted access at said opening for wall material.

4. The anchor of claim 1 wherein said leading edge is distended along an outwardly curved edge extending from said centering tip.

5. The anchor of claim 2 wherein said leading edge is distended along an outwardly curved edge extending from said centering tip.

6. The anchor of claim 4 wherein said leading edge curves inwardly at the proximal end of said leading edge.

* * * * *